(12) United States Patent
Li et al.

(10) Patent No.: US 8,249,159 B2
(45) Date of Patent: Aug. 21, 2012

(54) SCALABLE VIDEO CODING WITH GRID MOTION ESTIMATION AND COMPENSATION

(75) Inventors: Zhengguo Li, Singapore (SG); Xiaokang Yang, Singapore (SG); Keng Pang Lim, Singapore (SG); Xiao Lin, Singapore (SG); Susanto Rahardja, Singapore (SG); Feng Pan, Singapore (SG)

(73) Assignee: Agency for Science, Technology and Research, Centros (SG)

( * ) Notice: Subject to any disclaimer, the term of this patent is extended or adjusted under 35 U.S.C. 154(b) by 1244 days.

(21) Appl. No.: 11/571,268

(22) PCT Filed: Jun. 23, 2005

(86) PCT No.: PCT/SG2005/000206
§ 371 (c)(1),
(2), (4) Date: Jul. 5, 2007

(87) PCT Pub. No.: WO2006/001777
PCT Pub. Date: Jan. 5, 2006

(65) Prior Publication Data
US 2008/0013630 A1    Jan. 17, 2008

Related U.S. Application Data
(60) Provisional application No. 60/582,444, filed on Jun. 23, 2004.

(51) Int. Cl.
*H04N 7/28* (2006.01)
*H04N 11/02* (2006.01)
*H04N 7/32* (2006.01)

(52) U.S. Cl. .......... 375/240.16; 375/240.11; 375/240.12

(58) Field of Classification Search . 375/240.01–240.29
See application file for complete search history.

(56) References Cited

U.S. PATENT DOCUMENTS
5,818,536 A * 10/1998 Morris et al. ............ 375/240.15
(Continued)

FOREIGN PATENT DOCUMENTS
GB    2 363 274 A1   12/2001
(Continued)

OTHER PUBLICATIONS
Tsai, Sam S. et al., "Motion information scalability for MC-EZBC", Signal Processing Communication 19 (2004), p. 675-684, May 2004.*
(Continued)

*Primary Examiner* — Joseph Ustaris
*Assistant Examiner* — On S Mung
(74) *Attorney, Agent, or Firm* — Hultquist, PLLC; Steven J. Hultquist; Frank J. Bozzo (57) ABSTRACT

A scalable coder having a grid motion estimation and compensation module (110), a motion compensation temporal filtering module (105), a scalable coding module (115), a discrete transformation module (120), and a packetization module (135). The grid-motion estimation and compensation module (110) outputs a scalable motion vector from the source video data, supplied resolution and bit rate parameters. The motion compensation temporal filtering module (105) generates, from the source video data and the scalable motion vector, a residual image corresponding to the difference between the present and previous image frames. The scalable coding module (115) is coupled to receive and encode the scalable motion vector. The discrete transformation module (120) is configured to receive and domain transform the supplied video to a sequence of coefficients. The packetization module is coupled to the scalable coding module (115) and the discrete transformation module (120), and is operable to combine the encoded scalable motion vector and the sequence of coefficients into a packet.

20 Claims, 3 Drawing Sheets

U.S. PATENT DOCUMENTS

| | | | |
|---|---|---|---|
| 6,018,368 A * | 1/2000 | Kim et al. | 375/240.24 |
| 2002/0159518 A1 * | 10/2002 | Bottreau et al. | 375/240.1 |
| 2004/0114689 A1 | 6/2004 | Zhang et al. | |
| 2004/0252901 A1 * | 12/2004 | Klein Gunnewiek et al. | 382/240 |
| 2004/0264546 A1 * | 12/2004 | Wong et al. | 374/209 |
| 2005/0117641 A1 * | 6/2005 | Xu et al. | 375/240.08 |
| 2005/0201468 A1 * | 9/2005 | Tsai et al. | 375/240.19 |

FOREIGN PATENT DOCUMENTS

| | | |
|---|---|---|
| JP | H10-510132 A | 9/1998 |
| JP | 2004-502358 A | 1/2004 |
| WO | 02102048 A2 | 12/2002 |

OTHER PUBLICATIONS

Bottreau, V., et al., "A fully scalable 3D subband video codec", "Image Processing, 2001. Proceedings 2001 International Conference on Video Imaging", Oct. 2001, pp. 1017-1020, vol. 2, Publisher: IEEE.

Calvagno, Giancarlo, et al., "Multiresolution motion estimation for the MPEG coder", "Proceedings of the SPIE vol. 2668: Digital Video Compression: Algorithms and Technologies 1996 (Bhaskaran, Sijstermans, Panchanathan, Eds.)", Mar. 1996, pp. 111-121, vol. 2668.

Choi, Seung-Jong, et al., "Motion-compensated 3-D subband coding of video", "IEEE Trans. Image Proc.", Feb. 1999, pp. 155-167, vol. 8, No. 2.

Han, Woo-Jin, "Responses of Call-for-Proposal for Scalable Video Coding", "ISO/IEC JTC 1/SC 29/WG 11; MPEG2004 / M10569/ S17", Mar. 2004, Publisher: International Organization for Standardization, Published in: Muchen, Germany.

Hang, Hsueh-Ming, et al., "Motion Information Scalability for MC-EZBC: Response to Call for Evidence on Scalable Video Coding", "ISO/IEC JTC1/SC29/WG11; MPEG2003/ m9756; Coding of Moving Pictures and Audio", Jul. 2003, Publisher: International Organization for Standardization.

Ohm, J.R., "Three-dimensional subband coding with motion compensation", "IEEE Trans. Image Proc.", Sep. 1994, pp. 559-571, vol. 3, No. 5.

Hang, H., et al., "Motion Information Scalability for MC-EZBC: Response to Call for Evidence on Scalable Video Coding", "National Chiao Tung University, Taiwan", 2003.

Li, Z., et al., "Customer Oriented Scalable Video Coding", "Institute for Infocomm Research, Singapore", 2004.

Ohm, J., "Motion-Compensated 3-D Subband Coding With Multiresolution Representation of Motion Parameters", "IEEE", 1994.

Taubman, D., et al., "Highly Scalable Video Compression with Scalable Motion Coding", "IEEE", 2003.

Xu, J., et al., "3D Sub-band Video Coding Using Barbell Lifting", "MRSA Asia IM Group, MS CMPT Group", 2004.

* cited by examiner

Fig. 4

SCALABLE VIDEO CODING WITH GRID MOTION ESTIMATION AND COMPENSATION

CROSS REFERENCE TO RELATED APPLICATIONS

This application is filed under the provisions of 35 U.S.C. §371 and claims the priority of International Patent Application No. PCT/SG2005/000206 filed 23 Jun. 2005, which in turn claims the benefit of U.S. Provisional Patent Application No. 60/582,444 filed Jun. 23, 2004. The disclosures of said International Patent Application and said U.S. Provisional Patent Application are hereby incorporated herein by reference, in their respective entireties.

BACKGROUND

The present invention relates to video coding, and more particularly to scalable video coding in which motion estimation and compensation can be optimized as a function of a desired bit rate range, frame rate and resolution.

Three dimensional sub-band wavelet coding has been proposed as an efficient scalable video coding (SVC) technique, the development of which as described by J. Ohm in "Three Dimensional Sub-band Coding with Motion Compensation," IEEE Trans. on Image Processing, Vol. 3, No. 9, pp 559-571, September 1994. In such a scheme, four types of redundancy are removed: temporal, spatial, perceptual and statistical.

Temporal redundancy can be removed by performing an open look based motion compensation, whereby the reference frames for the motion compensation are the original ones instead of the reconstructed ones in the existing standards such as in MPEG 1/2/4 compression standards, and H.263/4. The open loop based motion compensation technique is referred to herein as "motion compensation temporal filtering," or alternatively, MCTF, the development of which as described by J. Ohm in the aforementioned reference. A further refinement of MCTF was described by S. Choi and J. Woods in "Motion Compensated 3-D Sub-band Coding of Video," IEEE Trans. on Image Processing. Vol. 8, No. 2, pp. 155-167, February 1999. In this later work, MCTF was improved by making the direction of the motion estimation the same as that of the motion compensation. In this technique, several rounds of MCTF are performed to provide the desired temporal scalability and remove the unnecessary temporal redundancy. During each MCTF round, high and low sub-band coefficients are generated for each motion compensated pair using a rate distortion optimization with the utilization of a Lagrangian multiplier ($\lambda$), where $\lambda$ corresponds to a bit rate range and a trade-off between the motion information and residual data. The trade-off between the quantity of transmitted motion information and residual data is an important feature in the scalable video systems, whereby a large $\lambda$ corresponds to a low bit rate and small quantity of transmitted motion information, and a small $\lambda$ corresponds to a high bit rate and large quantity of transmitted motion information. Generally, the optimal point of the SVC system is the point where the first residual image is generated for each motion compensation pair, and usually only one such point exists.

Once all of the necessary MCTF operations have been performed, a spatial transformation is typically performed on each sub-band to remove spatial redundancy. Most typically, the spatial transform used in such an operation is either a discrete cosine transformation (DCT) or a discrete wavelet transform (DWT).

Perceptual redundancy is typically removed by quantizing frequency domain residual data, usually through the use of a quantization matrix. The quantization matrix is designed according to an important feature of the human visual system (HVS), i.e., the human eyes are more sensitive to low frequency components and less to high frequency components. Accordingly, a small element is chosen for the residual data at low frequency while a large one is chosen for the high frequency data. The quantization process is typically lossy, and the SNR scalability is achieved through proper selection of quantization steps at different transmission bit rates.

Upon the removal of the temporal, spatial and perceptual redundancy, residual data and motion information are generated for entropy coding, which is used to remove statistical redundancy. In this process, short symbols are used to represent values which occurring more frequently, and long symbols for values occurring less so. Variable length coding and arithmetic coding are exemplary coding types used in the process.

Conventional scalable video coding systems typically employ small Lagrangian multipliers $\lambda$ in order to obtain the optimal system performance at the highest bit rate. However, the visual quality at lower bit rate streams in such systems is relatively poor, as the truncated bits contain too much motion information without sufficient residual data. An attempt to improve the coding efficiency at lower bit rates was described by H. Hang, S. Tsai, and T. Chiang in "Motion Information Scalability for MC-EZBC: Response to Call for Evidence of Scalable Video Coding," ISO/IEC JTC1/Sc29/WG11, MPEG200/m9756, July, 2003 Tronheim. Therein, the motion information in the temporal decomposition is divided into a base and an enhancement layers. The base layer is composed of motion information form 64×64 to 16×16, while the enhancement layer consists of information form 8×8 to 4×4, wherein only the motion information from the base layer is sent to the decoder at the low bit rate. However, the residual data is obtained at the high bit rate, and thus a motion mismatch occurs. If the area is relatively smooth, the difference in the motion information obtained will not be too significant. However, if the area is highly textured, the difference in the motion information will result in significant distortion. As a result, coding efficiency may remain low at low bit rate transmissions with the proposed scheme.

Further disadvantageously, the proposed techniques are not optimal from an implementation or commercial point of view, in that they do not take into consideration that different providers will have varying customer compositions and accordingly varying bit rate, frame rate and resolution requirements. Table 1 illustrates an example of this.

TABLE 1

| Customer Composition of Companies A & B | | | |
|---|---|---|---|
| Company | QCIF<br>7.5 f/s<br>64 kbs | CIF<br>15 f/s<br>512 kbs | 4CIF<br>60 f/s<br>2 Mb/s |
| A | 2M | 100K | 10K |
| B | 10K | 100K | 1.5M |

Assume that Companies A and B having the illustrated customer compositions. Clearly, the optimal operating conditions for Company A are QCIF, 7.5 f/s, and 64 Kb/s, whereas Company B operates at conditions 4CIF, 60 f/s and a bit rate of 2 Mb/s. In such an instance, the conventional video coding systems which are designed for optimal performance at the highest bit rate are not optimal for Company A, as the majority of its customers utilize a lower bit rate service.

Accordingly what is needed is an improved video coding system which can provide optimal performance at arbitrary bit rates, frame rate and resolution.

SUMMARY

The present invention provides a scalable video coder having a grid motion estimation and compensation module, a motion compensation temporal filtering module, a scalable coding module, a discrete transformation module, and a packetization module. The grid-motion estimation and compensation module includes a first input for receiving source video data, a second input for receiving desired bit rate and resolution parameters and an output, and is operable to output a scalable motion vector computed from the source video data, and the supplied resolution and bit rate parameters. The motion compensation temporal filtering module includes a first input for receiving the source video data, a second input for receiving the scalable motion vector, and an output, the motion compensation temporal filtering module operable to generate a residual image corresponding to the difference between images in the present and previous frames. The scalable coding module is coupled to receive and encode the scalable motion vector. The discrete transformation module has an input configured to receive and domain transform the supplied video data to a sequence of coefficients. The packetization module is coupled to the scalable coding module and the discrete transformation module, and is operable to combine the encoded scalable motion vector and the sequence of coefficients into a packet.

These and other features of the invention will be better understood when taken in light of the following drawings and detailed description.

DETAILED DESCRIPTION

Figure 1:
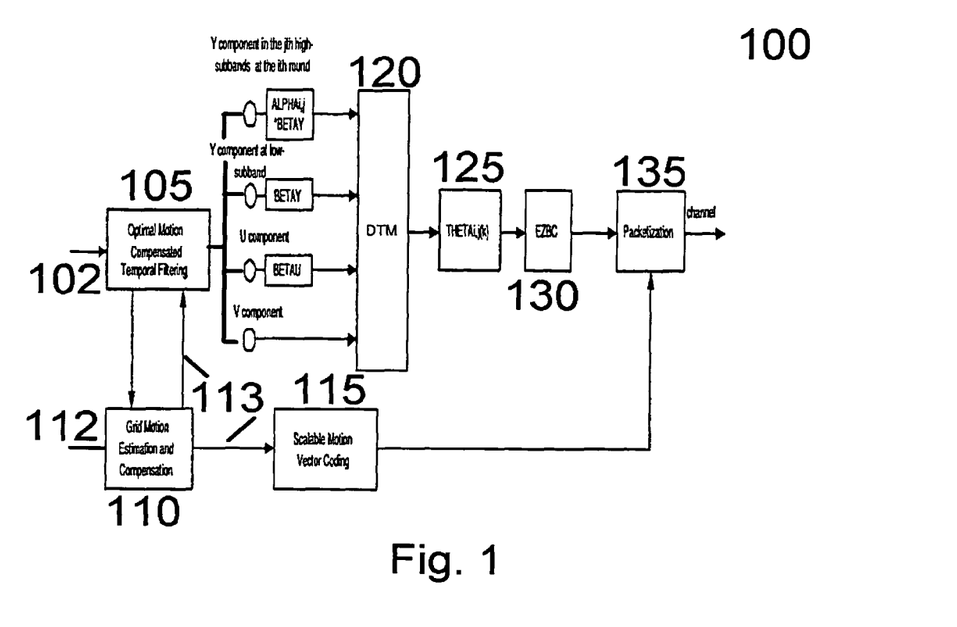
FIG. 1 illustrates a scalable video coder with grid motion estimation and compensation in accordance with one embodiment of the present invention.

FIG. 1 illustrates a scalable video encoder 100 which utilizes grid motion estimation and compensation (grid ME/MC) in accordance with the present invention. The encoder 100 includes a motion compensated temporal filtering (MCTF) module 105, a grid ME/MC module 110, a scalable motion vector coding module 115, a discrete transform module (DTM) 120, a frame layer shift module, an embedded zero block coding (EZBC) module 130, and a packetization module 135.

During operation, video information 102 is supplied to the MCTF module 105. The MCTF module 105 forwards the video information to the grid ME/MC module 110. Responsive to receiving the video information 102 and additionally supplied user parameters comprising an optimal resolution level, frame rate and bit rate, the grid ME/MC module computes a scalable motion vector 113 which it supplied to the MCTF module and a coding module 115.

Upon receiving the scalable motion vector, the MCTF module 105 produces residual images corresponding to the difference between images in the present and previous frames. The residual images are output from the MCTF module 105 as luminance information comprising Y plane high and low sub-band data, and chrominance information comprising U and V plane data. The supplied Y, U and V data is transformed using a discrete transformation module 120, which outputs corresponding coefficients. In a particular embodiment of the invention, the discrete transformation module 120 employs a two-dimensional discrete wavelet transformation. In an alternative embodiment, a two-dimensional discrete cosine transformation is employed. The coefficients are subsequently supplied to the frame layer shift module 125. The EZBC module codes the residual data in a bit plane manner and SNR fine granularity scalability is achieved. The coding module 115 codes the scalable motion vector for packetization with the coded residual data. The packetization module 130 combines the coded scalable motion vectors and the residual data from module 130 for transmission over the communication medium, such as the internet, to the destination receiver.

The described architecture is only exemplary and those skilled in the art will realized that many modifications thereto are possible. In an exemplary embodiment of the present invention, it can be used to improve the coding efficiency of the existing fine granularity scalability (FGS) coding. In the preferred embodiment of the present invention, the processes performed by the scalable motion vector coding module 115, the DWT module 120, the frame layer shift module 125, the EZBC module 130 and the packetization module 135 are carried out using conventional processes. The processes carried out by the MCTF module are generally as described in the prior art, with refinements as described herein. The operation of the grid ME/MC module 110 is one of the subjects of the present invention and is further described below.

Figure 2:
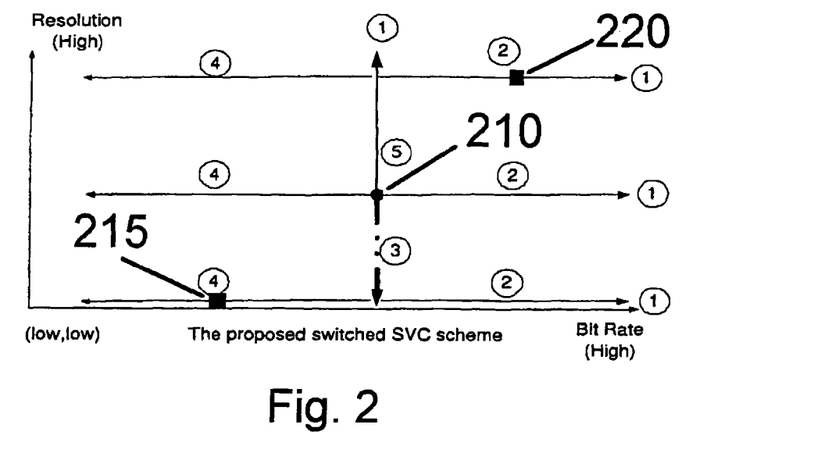
FIG. 2 illustrates a functional representation of a grid motion estimation and compensation process in accordance with one embodiment of the present invention.

FIG. 2 illustrates a functional representation of a grid ME/MC process in accordance with one embodiment of the present invention. The grid is defined in terms of bit rate ranges along one (x) axis, and resolution levels along a second (y) axis. An optimal point 210 is selected which corresponds to the desired bit rate range and resolution level. Suboptimal points 215 and 220 which are located around the optimal point can be selected, each of the sub-optimal points corresponding to a desired, but less important bit rate ranges and/or resolution levels. Coding efficiency is optimized around the optimal point 210, and secondarily extended to the suboptimal points 215 and 220 based upon the point's relative importance.

FIG. 2 further illustrates encircled numerals 1-5 indicating a particular grid ME/MC process. Starting from the optimal point 210, a basic ME/MC process is performed, which results in the generation of motion vectors and a residual image corresponding thereto. Moving to a lower bit rate at the same, higher or lower resolution levels (numeral 4), the grid ME/MC process includes the truncation of bit rate data. Moving from the optimal point 210 to a lower resolution at the same bit rate (numeral 3), the grid ME/MC process includes the truncation of resolution data. Moving toward a higher resolution at the same bit rate (numeral 5), the resolution is refined by a recursive ME/MC process. Moving toward a higher data rate at the same, higher or lower bit rates (numeral 2), the bit rate is refined by a recursive ME/MC process.

Each of these processes is further described below.

In accordance with the present invention, two or more parameters are predefined for the motion estimations corresponding to different bit rate ranges at the $l^{th}$ temporal level. The parameters are defined as: $\lambda_{low}(l)$, $\lambda_{opt}(l)$ and $\lambda_{high}(l)$, respectively, and satisfy Eq. (1):

$$\lambda_{low}(l) \geqq \lambda_{opt}(l) \geqq \lambda_{high}(l) \qquad (1);$$

$\lambda_{low}(l)$ corresponds to the lowest bit rate, $\lambda_{opt}(l)$ corresponds to the selected optimal bit rate range, and $\lambda_{high}(l)$ corresponds to the highest bit rate range.

In a particular embodiment of the present invention, the grid ME/MC is performed with two parameters $\lambda_{opt}(l)$ and $\lambda_{high}(l)$. In such an embodiment, two groups of motion information and two residual images are generated for each motion compensation pair in each resolution. They are used to generate the motion information and the residual data that will be coded at each range.

In conventional systems, ME/MC is optimized at the highest bit rate and highest resolution. In such systems, only one residual image and corresponding motion vector are generated for each motion pair (previous two video frames).

In the present invention, grid ME/MC is achieved in one of five ways: (i) by means of basic ME/MC in which a basic residual image and corresponding motion vector are generated for each motion compensated pair; (ii) by means of a resolution refined ME/MC in which a resolution refined residual image and corresponding motion vectors are generated for each motion compensated pair; (iii) by means of a signal-to-noise-ratio (SNR) refined ME/MC at lower resolution in which a SNR refined residual image and the corresponding motion vectors are generated for each motion compensated pair in the lower resolution; (iv) by means of a SNR refined ME/MC in the most important resolution in which a SNR refined residual image and the corresponding vectors are generated for each motion compensated pair in the most important resolution; and (v) by means of both SNR, and resolution refined ME/MC in which both SNR and resolution refined residual information and the corresponding motion vectors are generated for each motion compensation pair.

Basic Motion Estimation at each Temporal Level

In an exemplary embodiment, the total number of temporal levels is L, and the most important point is chosen at the $l_0^{th}$ temporal level. An optimal Lagrangian multiplier $\hat{\lambda}_{opt}(l)$ is defined as follows:

$$\hat{\lambda}_{opt}(l) = \begin{cases} \lambda_{high}(l) & l < l_0 \\ \lambda_{opt}(l) & l \geq l_0 \end{cases} \qquad (2)$$

At the temporal level l (l=1, 2, 3, ..., L), a resolution $\phi(l)$ is chosen as the most important resolution by the user according to the customer composition. The motion compensation starts from the resolution $\phi(l)$ with the parameter $\hat{\lambda}_{opt}(l)$ at the $l^{th}$ temporal level, and is called the basic motion compensation at the $l^{th}$ temporal level.

To provide the performance of the optimal point, the residual image is generated according to the following two cases:

Case 1: $l < l_0$. Residual images are generated only using $\lambda_{high}(l)$;

Case 2: $l \geqq l_0$. The motion estimation and compensation are performed with $\lambda_{opt}(l)$ and $\lambda_{high}(l)$.

Thus, there are two residual images generated for each motion compensation pair in each resolution at the temporal level $l (l \geqq l_0)$. They are used to generate the motion information and the residual image that will be coded at each range.

To provide coding efficiency over the optimal bit rate range, motion information for the bit rate ranges lower than the optimal range is truncated from that obtained by the basic motion estimation. Similarly, in resolutions lower than $\phi(l)$, the motion information for the bit rate range corresponding to $\lambda_{opt}(l)$ and those lower than it are scaled down and truncated from the basic motion information.

SNR Scalability of Motion Information and Residual Data

The grid ME/MC starts from the bit rate range corresponding to the parameter $\lambda_{mv,opt}$. In a particular embodiment of the present invention, the SNR scalability of motion information and texture is achieved using (i) adaptive accuracy for grid ME/MC; (ii) refinement by recursive motion compensation; (iii) shared information among different bit rate ranges at the same resolution; (iv) motion information truncation at low bit rate ranges; and (v) redundancy removal in low and high bit rate ranges. Each of these processes is now described.

An Adaptive Accuracy for Grid Motion Estimation and Compensation

Initially before performing the grid motion estimation and compensation, an accuracy of motion vectors is chosen. In a particular embodiment, the accuracy is adaptive to the bit rate range. Normally, the accuracy of motion information is increased when the bit rate is increased. For example, half pixel can be chosen at low bit rate while quarter pixel can be chosen at medium and high bit rate. Additionally, the block size is from 32×32 to 8×8 instead of 16×16 to 4×4 in the H.264.

Refinement by Recursive Motion Compensation Along a Temporal Level

In such processes, $(dx_0, dy_0)$ denotes a motion vector obtained by the grid ME/MC with $\lambda_{opt}(l)$. $(dx, dy)$ is a motion vector positioned around $(dx_0, dy_0)$, and is a candidate for the refinement. A first recursive motion refinement distortion criterion is defined for the $l_0$ th round of MCTF, as follows:

$$D_{cl_0}(dx, dy, dx_0, dy_0) = \sum_{x,y} |A(x, y) - \qquad (3)$$
$$B(x - dx, y - dy) - IQ(Q(A(x, y) - B(x - dx_0, y - dy_0))|$$

where IQ( ) and Q( ) are a quantization operation and the corresponding inverse quantization operation, A(x, y) and B(x, y) are the predicted frame and the reference frame, respectively. $D_{cl_0}(dx, dy, dx_0, dy_0)$ is a generalized distortion criterion for motion estimation and compensation. The maximum coding gain is nearly achieved by minimizing the signal energy of the temporal H sub-band, since the energy of the temporal L sub-band is relatively constant.

Further, $R_{mv}(dx-dx_0, dy-dy_0)$ represents the number of bits to code the motion vector $(dx-dx_0, dy-dy_0)$. A further motion estimation (dx, dy) is performed at the first round of MCTF, if the following inequality is satisfied:

$$D_{cl_0}(dx,dy,dx_0,dy_0) + \lambda_{high}(l) R_{mv}(dx-dx_0, dy-dy_0) \leqq D_{cl_0}$$
$$(dx_0, dy_0, dx_0, dy_0) \qquad (4)$$

Shared Information Among Different Bit Rate Ranges in the Same Resolution

Figure 3:
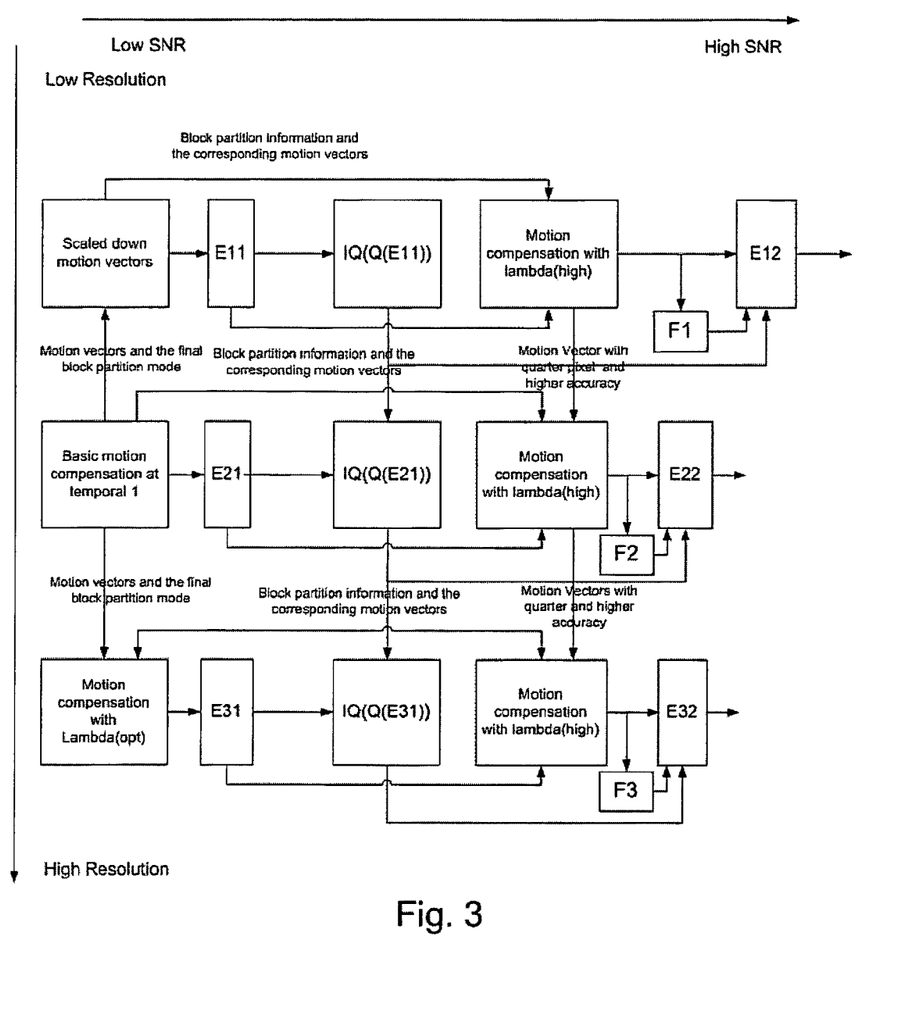
FIG. 3 illustrates a process for removing coding redundancy between low and high bit rate data in accordance with one embodiment of the present invention.

To speed up the motion estimations in the same resolution at the same temporal level (e.g., along the horizontal direction in FIG. 3, shown below), block partition information and the corresponding motion information may be shared by the motion estimation at different bit rates. When employed, the shared information will depend upon the user's choice. For example, the user may fix the final block partition model. In this case, the final block partition mode and the corresponding motion information are shared, and the number of motion information is the same at the different bit rates. The user may also fix the initial full motion vector tree obtained in the motion estimation process. The initial full motion vector tree and the corresponding motion information are shared. The tree pruning processes are performed by using $\hat{\lambda}_{opt}(l)$ and $\hat{\lambda}_{high}(l)$ from the same initial full motion vector tree. Further, the amount of motion information may not be the same at different bit rates. The user can choose to fix the final block partition mode in one resolution while repairing the initial full motion vector tree in another resolution.

Motion Information Truncation at Low Bit Rate Ranges

In each resolution, motion information at low bit rate are truncated from those obtained in the basic motion estimation by using rate distortion optimization with a parameter $\lambda_{low}(l)$ corresponding to that range.

In such a process, $B(x, y)$ is the reference picture. Vectors $(dx, dy)$ and $(dx_0, dy_0)$ are two motion vectors, where $(dx_0, dy_0)$ is obtained by using the parameter $\hat{\lambda}_{opt}(l)$ and $(dx, dy)$ is the truncated motion vector of $(dx_0, dy_0)$. A truncation distortion criteria is defined as follows:

$$D_t(dx, dy, dx_0, dy_0) = \sum_{x,y} |B(x-dx, y-dy) - B(x-dx_0, y-dy_0)| \quad (5)$$

The motion vector $(dx_0, dy_0)$ is truncated into $(dx, dy)$ if the following inequality is satisfied.

$$\lambda_{low}(l)R_{mv}(dx,dy)+D_t(dx,dy,dx_0,dy_0)<\lambda_{low}(l)R_{mv}(dx_0,dy_0) \quad (6)$$

For two Lagrangian multipliers $\lambda_1 > \lambda_2$, if a motion vector $(dx_0, dy_0)$ is truncated into $(dx, dy)$ with $\lambda_1$, it will also be truncated into $(dx, dy)$ with $\lambda_2$. In other words, the set of motion vectors at a bit rate is a subset of those at a relative high bit rate.

Next, a prediction distortion criteria is defined as follows:

$$D_p(dx, dy) = \sum_{x,y} |A(x, y) - B(x-dx, y-dy)| \quad (7)$$

It can be determined from Eq. (6) that:

$$\lambda_{low}(l)R_{mv}(dx,dy)+D_t(dx,dy,dx_0,dy_0)+D_p(dx_0,dy_0)<\lambda_{low}(l)R_{mv}(dx_0,dy_0)+D_p(dx_0,dy_0) \quad (8)$$

that is:

$$\lambda_{low}(l)R_{mv}(dx,dy)+D_p(dx,dy)<\lambda_{low}(l)R_{mv}(dx_0,dy_0)+D_p(dx_0,dy_0) \quad (9)$$

It can be observed that the motion vectors at low bit rate are obtained by using Eq. (9), while the enhancement layers of motion information correspond to high bit rates and are generated using a set of relatively small $\lambda$s in the existing schemes. If a motion vector is truncated using the grid ME/MC processes of the present invention, it will also be pruned in the conventional ones, while the reverse does not hold. The process according to the conventional ME/MC methods is optimal if the residual image to be coded at low bit rate is the residual image generated by using $\lambda_{low}(l)$. However, it is generated using the parameter $\lambda_{opt}(l)$ instead of $\lambda_{low}(l)$. This implies that the motion information is insufficient in the sense of the RDO at low bit rate. As a result, the motion mismatch may be serious in the conventional system, and the coding efficiency will be very low at low bit rates.

To ensure coding efficiency over the optimal bit rate range, $(dx, dy)$ preferably satisfies the condition:

$$\hat{\lambda}_{opt}(l) \sum_{dx,dy} R_{mv}(dx-dx_0, dy-dy_0) \leq \theta_1 \quad (10)$$

where $\theta_1$ is an threshold chosen by the user as to the number of bits for coding the redundancy caused by scalable motion vector coding.

In such an instance, the switching points are computed by:

$$\max_{\lambda} \{R(\lambda)\} \quad (11)$$

such that for all motion compensation in the current group of files (GOF), we have $$\lambda R_{mv}(dx,dy)+D_t(dx,dy,dx_0,dy_0)<\lambda R_{mv}(dx_0,dy_0) \quad (12)$$

It is to be noted that only the motion information to be coded is switched, but the residual image to be coded is not changed in the truncation.

Removing Redundancy between Low and High Bit Rate

The redundant coded information is preferably removed to improve the coding efficiency. FIG. 3 illustrates this process in which residual images in three resolutions after the motion compensation with $\hat{\lambda}_{opt}(l)$ and $\hat{\lambda}_{high}(l)$ are represented as E11, E21, E31, F1, F2 and F3, respectively. The redundancy between IQ(Q((E11)) and F1, IQ(Q((E21)) and F2, IQ(Q((E31)) and F3 is preferably removed. The residual images E12, E22 and E32 for the coding at high bit rate are thus computed by:

$$E12=F1-IQ(Q((E11)) \quad (13)$$

$$E22=F2-IQ(Q((E21)) \quad (14)$$

$$E32=F3-IQ(Q((E31)) \quad (15)$$

Temporal Scalability of Motion Information and Residual Data

In an exemplary embodiment of the present invention, temporal scalability of motion information and residual data is achieved by binding the motion information with the temporal high sub-band residual data coefficients at the same level and dropping them together if it is necessary.

Two temporal low subbands and high subbands are generated corresponding to two constants at temporal level $l(l>l_0)$. The remaining MCTFs at those levels are performed using the corresponding low subbands.

In an exemplary embodiment of the present invention, $L_{r,1}(x, y)$ and $L_{o,1}(x, y)$ are the predicted low subbands obtained by the refinement and the original optimal scheme, respectively, $L_{r,2}(x, y)$ and $L_{o,2}(x, y)$ are the reference low subbands obtained by the refinement and the original optimal scheme, respectively.

The motion compensation starts using $\hat{\lambda}_{opt}(l)$, $L_{o,1}(x, y)$ and $L_{o,2}(x, y)$. We should fully take advantage of the motion vectors (MVs) and block partition modes obtained using $\hat{\lambda}_{opt}(l)$ when we perform motion compensation using $\hat{\lambda}_{high}(l)$, $L_{r,1}(x, y)$ and $L_{r,2}(x, y)$. The coded MVs of a block in the previous layer can be used as one candidate of predicted MV and the block partition modes obtained from the previous layer can be regarded as the initial status of partitioning for the co-located block. Similarly, the second recursive motion refinement distortion criteria can be defined for another round of MCTF, as follows:

$$D_{cl}(dx_0, dy_0) = \sum_{x,y} |L_{o,1}(x, y) - L_{o,2}(x - dx_0, y - dy_0) - \quad (16)$$
$$IQ(Q(L_{o,1}(x, y) - L_{o,2}(x - dx_0, y - dy_0)))|$$

$$\hat{D}_{cl}(dx, dy, dx_0, dy_0) = \sum_{x,y} |L_{r,1}(x, y) - L_{r,2}(x - dx_0, y - dy_0) - \quad (17)$$
$$IQ(Q(L_{o,1}(x, y) - L_{o,2}(x - dx_0, y - dy_0)))|$$

A further motion estimation (dx, dy) is performed at the ith round of MCTF, if the following inequality is satisfied:

$$\hat{D}_{cl}(dx,dy,dx_0,dy_0) + \lambda_{high}(l)R_{mv}(dx - dx_0, dy - dy_0) < D_{cl}(dx_0, dy_0) \quad (18)$$

The above process is called refinement by recursive motion compensation. The switching point is computed by:

$$\max_{\lambda} \{R(\lambda)\} \quad (19)$$

Such that for all motion compensation in the current group of files (GOF), resulting in $$\hat{D}_{cl}(dx,dy,dx_0,dy_0) + \lambda R_{mv}(dx - dx_0, dy - dy_0) < D_{cl}(dx_0, dy_0) \quad (20)$$

where R(λ) is the bit rate range corresponding to the parameter λ.

Notice that both the motion information and the residual image to be coded are switched when the recursive motion refinement approach is used.

In the resolution lower than φ(l), only one motion compensation with the parameter $\lambda_{high}(l)$ is performed. In the resolution φ(l), the other motion compensation with the parameter $\lambda_{high}(l)$ is further performed to refine the residual image. In the resolution higher than φ(l), one motion compensation with $\lambda_{opt}(l)$ and the other one with $\lambda_{high}(l)$ are performed to generate the optimal motion information and the optimal residual images for the corresponding bit rate ranges. In each refinement, the corresponding residual image and motion information are generated for the remaining coding process at the corresponding bit rate range.

Spatial Scalability of Motion Information and Residual Data

The temporal filtering starts from and is optimized in the most important (optimal) resolution. Independent and refined motion estimation and compensation can be performed for the resolution higher than the most important one. The motion information of the most important one is truncated to generate that of the resolution lower than the most important one. The resultant residual images corresponding to the resolution and the high ones are merged into one residual image. For the sake of simplicity, we assume that there are totally three resolutions and φ(l)=2. The spatial scalability of motion information and texture is achieved through the processes of (i) motion information and residual images in the middle resolution; (ii) motion information and residual images in the high resolution; and (iii) motion information truncation in resolutions lower than the optimal resolution. Each of these processes is further described below.

Motion Information and Residual Images in the Middle Resolution

Suppose that the reference frames are $\tilde{B}(x, y)$ and $B(x, y)$ in the middle and the highest resolutions. $\tilde{B}(x, y)$ can be $S_D(B(x, y))$, where the parameter $S_D( )$ denotes a down-sampling operation, as described by W. Han in "Response of Call for Proposal for Scalable Video Coding," ISO/IEC JTC1/SC 29 WG 11 MPEG2004/M10569/S7, München, Germany, March 2004. $\tilde{B}(x, y)$ and $B(x, y)$ can also be independent. The motion information and the residual images are generated using motion estimation and compensation between $\tilde{B}(x, y)$, $S_D(A(x, y))$ and the following distortion criterion:

$$D_{S_D P}(dx, dy) = \sum_{x,y} |S_D(A)(x, y) - \tilde{B}(x - dx, y - dy)| \quad (21)$$

Motion Information and Residual Image in the High Resolution

For fast and efficient estimation and coding in the highest resolution, advantage is taken of the MVs and block partition modes already coded in the middle resolution. All MVs are preferably first scaled up by a factor of 2 and then serve as candidates of predicted MV and the block partition modes obtained from the previous layer can be regarded as the initial status of partitioning for the co-located block in the highest resolution.

The motion information and the residual images are generated using motion estimation and compensation between B(x, y), A(x, y) and the following distortion criterion:

$$D_{S_D S_U P}(dx, dy) = \sum_{x,y} |A(x, y) - S_U(S_D(A))(x, y) - \quad (22)$$
$$(B(x - dx, y - dy) - S_U(\tilde{B})(x - dx, y - dy))|$$

where $S_U$ denotes an up-sampling operation, as described by W. Han in the aforementioned reference.

The coded residual image IQ(Q(E31)) in FIG. 3 is computed by:

$$IQ(Q(E31)) = S_U(IQ(Q(E21)) + \tilde{B} - S_D(B)) + IQ(Q(E31 - S_U(S_D(E31)))) \quad (23)$$

as described by W. Han in the aforementioned reference. The corresponding residual image and motion information are generated for the remaining coding process in the corresponding resolution.

Motion Information Truncation in the Low Resolution

In the lowest resolution, all MVs for the bit rate range corresponding to $\hat{\lambda}_{opt}(l)$ are scaled down and truncated from those in the middle resolution. All MVs are first scaled down by a factor of 2 after one resolution down. The final block partition mode in the resolution φ(l) serves as the initial full motion vector tree in the next resolution lower than φ(l). The tree pruning process is performed using the $\hat{\lambda}_{opt}(l)$ to generate the final block partition mode. Similarly, the motion information and the final block partition mode in other low resolutions can be obtained.

The vectors (dx, dy) and $(dx_0, dy_0)$ are two motion vectors where $(2dx_0, 2dy_0)$ are obtained by using the basic ME/MC in FIG. 3 and (dx, dy) is the truncation one of $(dx_0, dy_0)$. Another truncation distortion criterion is defined as follows:

$$D_{rt}(dx, dy, dx_0, dy_0) = \quad (24)$$
$$\sum_{x,y} |S_D(\tilde{B}(x - 2dx, y - 2dy)) - S_D(\tilde{B}(x - 2dx_0, y - 2dy_0))|$$

The motion vector $(dx_0, dy_0)$ is truncated into $(dx, dy)$ if the following inequality is satisfied:

$$\hat{\lambda}_{opt}(l)R_{mv}(dx,dy)+D_{rt}(dx,dy,dx_0,dy_0)<\hat{\lambda}_{opt}(l)R_{mv}(dx_0,dy_0) \quad (25)$$

Similarly, to ensure coding efficiency of the optimal bit rate range, $(dx, dy)$ preferably satisfies the following inequality:

$$\hat{\lambda}_{opt}(l)\sum_{dx,dy} R_{mv}(dx_0 - dx, dy_0 - dy) \leq \theta_2 \quad (26)$$

where $\theta_2$ is another bit number threshold selected by the user.

In a further embodiment of the invention, a bit is used to provide the user flexibility in deciding whether to switch on the existing video coding standards or not. For example, if the bit is set to 1, the existing video coding standards are switched on, the whole bitstream is either composed of two sub-bitstreams, one is compatible to the existing video coding standards, and the other is based on the MCTF, or composed of one bitstream which is compatible to the existing video coding standards. Otherwise, the whole bitstream is totally based on the MCTF.

As readily appreciated by those skilled in the art, the described processes may be implemented in hardware, software, firmware or a combination of these implementations as appropriate. Further, some or all of the described processes may be implemented as computer readable instruction code resident on a computer readable medium (removable disk, volatile or non-volatile memory, embedded processors, etc.), the instruction code operable to program a computer or other such programmable device to carry out the intended functions.

EXAMPLES

The general application of the described processes to a low delay case is now described. Initially, a bitstream for low delay case is generated optimally by seamless integration of the MCTF and the motion compensation prediction. Next, the desired video sequences for low delay case is generated, in one embodiment by using the MCTF with optimal parameter $\hat{\lambda}_{opt}(l)$.

For example, the input frame rate is 30 HZ and the frame size is 4CIF. The user wishes to optimize operation for a QCIF size video sequence with 7.5 HZ for low delay. In such an instance, the encoder generates a desired picture for the coding of low delay as follows: two rounds of temporal wavelet transformation are performed on four successive original pictures to generate a video sequence with 4CIF size and 7.5 HZ. Next, two rounds of two-dimensional spatial wavelet transformations are performed to generate a desired video sequence. Subsequently the video sequence is coded using, e.g., an H.264 encoder.

Next, the enhancement layer bitstream is generated. Thereafter, all necessary MCTFs on the original pictures with 4CIF size and the predefined parameters in each GOF are performed to generate low and high sub-bands. The reconstructed pictures in the H.264 coding process are used to perform the further rounds of MCTF to generate the corresponding low and high sub-bands. The redundancy among them will be removed by using the processes as described above. Subsequently, the remaining information is coded by using the existing methods for the MCTF.

An exemplary embodiment of designing a motion compensation scheme is as follows. Initially, the size of a GOF is chosen as 32 for the low delay bitstream, the original frames are denoted by $F_i(1 \leq i \leq 32)$. The desired temporal scalability for the low delay is 30 Hz, 15 Hz and 7.5 Hz, respectively. The tolerated delay is $\frac{2}{15}$s. Suppose that the generated frames after motion compensation are denoted by $P_i(1 \leq i \leq 32)$. The motion compensation scheme is described by:

$$\begin{bmatrix} P_1 \\ P_2 \\ P_3 \\ \vdots \\ P_{32} \end{bmatrix} = \begin{bmatrix} A_{11} & 0 & 0 & \ldots & 0 \\ A_{21} & A_{22} & 0 & \ldots & 0 \\ A_{31} & A_{32} & A_{33} & \ldots & 0 \\ \vdots & \vdots & \vdots & \ddots & \vdots \\ A_{81} & A_{82} & A_{83} & \ldots & A_{88} \end{bmatrix} \begin{bmatrix} F_1 \\ F_2 \\ F_3 \\ \vdots \\ F_{32} \end{bmatrix} \quad (27)$$

where $A_{ij} \in R^{4\times 4}$.

Note that there is no drift problem associated with the MCTF and the delay can be well controlled by the unconstrained MCTF as described in the aforementioned reference to W. Han. It is thus desirable to use the MCTF as much as possible and to integrate the MCTF with the unconstrained MCTF seamless when a low delay bitstream is provided. The following method can be used to achieve this objective:

1. All $A_{ii}(1 \leq i \leq 8)$ are determined by the MCTF;
2. All other $A_{ij}$ are determined by the MCTF and the unconstrained MCTF/ or the closed loop based motion compensation.

Let $$A = \begin{bmatrix} A_{11} & 0 & 0 & \ldots & 0 \\ A_{21} & A_{22} & 0 & \ldots & 0 \\ A_{31} & A_{32} & A_{33} & \ldots & 0 \\ \vdots & \vdots & \vdots & \ddots & \vdots \\ A_{81} & A_{82} & A_{83} & \ldots & A_{88} \end{bmatrix} \quad (28)$$

A necessary and sufficient condition for the perfect reconstruction is that all matrices $A_{ii}(1 \leq i \leq 8)$ are nonsingular. The video sequence is reconstructed by $$F = A^{-1}P \quad (29)$$

Figure 4:
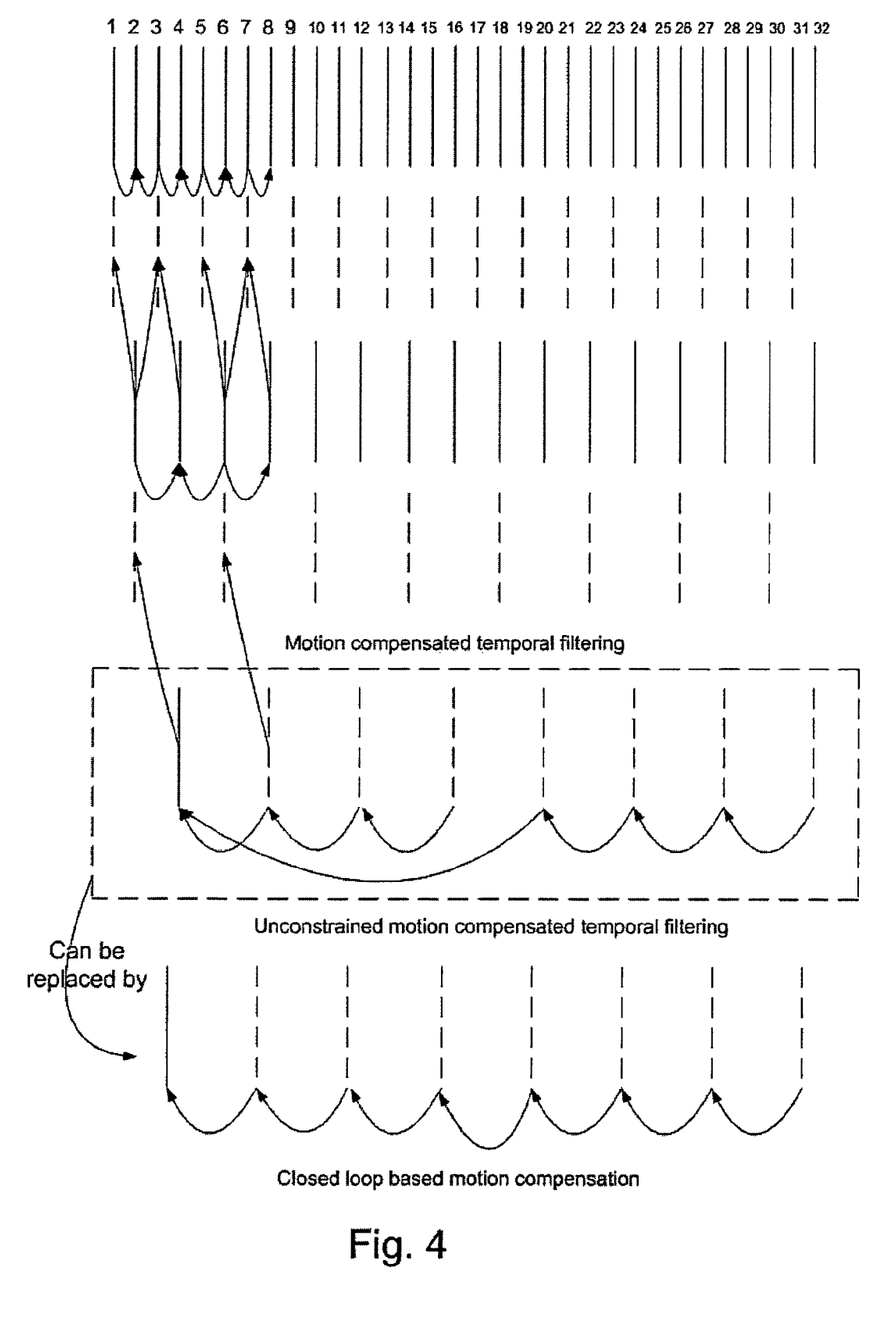
FIG. 4 illustrates a motion compensation temporal filtering process integrated with an unconstrained motion compensation temporal filtering process (or a closed loop based motion compensation scheme) in accordance with one embodiment of the present invention.

An interesting case is that all $A_{ii}(2 \leq i \leq 8)$ are the same. An example is illustrated in FIG. 4. The 5/3 transform is chosen in the MCTF. All $A_{ij}$ are equal to 0 except the matrices given as below:

$$A_{11} = \begin{bmatrix} 1 & -1 & 0 & 0 \\ 0 & -\frac{1}{2} & 1 & -\frac{1}{2} \\ \frac{1}{4} & \frac{7}{8} & -\frac{1}{4} & -\frac{7}{8} \\ \frac{1}{8} & \frac{3}{16} & \frac{3}{8} & \frac{5}{16} \end{bmatrix}$$

$$A_{ii} = \begin{bmatrix} 1 & -\frac{1}{2} & 0 & 0 \\ 0 & -\frac{1}{2} & 1 & -\frac{1}{2} \\ \frac{1}{4} & 1 & -\frac{1}{4} & -\frac{7}{8} \\ \frac{1}{8} & \frac{1}{4} & \frac{3}{8} & \frac{5}{16} \end{bmatrix}; 2 \leq i \leq 8$$

$$A_{i(i-1)} = \begin{bmatrix} 0 & 0 & 0 & -\frac{1}{2} \\ 0 & 0 & 0 & 0 \\ 0 & 0 & 0 & -\frac{1}{8} \\ -\frac{1}{8} & -\frac{3}{16} & -\frac{3}{8} & -\frac{5}{8} \end{bmatrix}; i = 2, 3, 4, 6, 7, 8$$

$$A_{54} = \begin{bmatrix} 0 & 0 & 0 & -\frac{1}{2} \\ 0 & 0 & 0 & 0 \\ 0 & 0 & 0 & -\frac{1}{8} \\ 0 & 0 & 0 & -\frac{1}{16} \end{bmatrix}$$

$$A_{53} = \begin{bmatrix} 0 & 0 & 0 & 0 \\ 0 & 0 & 0 & 0 \\ 0 & 0 & 0 & 0 \\ -\frac{1}{8} & -\frac{1}{4} & -\frac{3}{8} & -\frac{5}{16} \end{bmatrix}$$

It can be observed that there is a drift problem associated with the unconstrained MCTF, which can be ameliorated by controlling the length of the drift. In the above example, the length is set as 4.

In a second example, experiments are based on the MC-EZBC interframe wavelet coder, available in the MCEZBC software package at ftp://ftp.cipr.rpi.edu/personal/chen/. Four standard video sequences, Flower Garden and Football with SIF size (352×240), Mobile and Foreman with CIF size (352×288), are used in the test to compare the present scheme with the scheme disclosed in the aforementioned reference to Choi and Woods. The frame rates of these sequences are set as 30 f/s. The bit rate is 1024 kb/s. The hierarchical variable size block matching (HVSBM) algorithm described in the aforementioned reference to Choi and Woods is used with the maximum search width/height at the lowest resolution in the hierarchical motion estimation set as 1 pixel. The overlapped block motion compensation (OBMC) scheme with ⅛ block overlapped is also employed in our experiments to give better smoothness in the motion information field. The accuracy of motion information is half pixel. The $\lambda_{opt}(1)$ for the pruning process is chosen as 224. Assume that the optimal point is chosen at the low bit rate according to the customer composition.

The experimental results are shown in Tables 2-5, where a hyphen "-" denotes an insufficient bit rate for the motion information. It can be shown that our scheme can be used to improve the PSNR by up to 4.5 dB.

TABLE 2

Comparison of the average PSNR for the sequence Football with different schemes, GOF size = 16

| Bit Rate(kb/s) | Y(PSNR) of [2] | Y(PSNR) of [4] | Y(PSNR) Invention |
|---|---|---|---|
| 320 | 24.69 | 24.69 | 25.31 |
| 280 | 23.72 | 23.72 | 24.83 |
| 256 | 23.19 | 23.19 | 24.54 |
| 190 | — | 18.84 | 23.76 |
| 170 | — | 18.82 | 23.49 |

TABLE 3

Comparison of the average PSNR for the sequence Garden with different schemes, GOF size = 16

| Bit Rate(kb/s) | Y(PSNR) of [2] | Y(PSNR) of [4] | Y(PSNR) Invention |
|---|---|---|---|
| 256 | 22.36 | 22.36 | 23.05 |
| 192 | 20.50 | 20.50 | 22.12 |
| 160 | 18.46 | 18.46 | 21.53 |
| 140 | — | 18.07 | 21.01 |
| 128 | — | 17.86 | 20.87 |

TABLE 4

Comparison of the average PSNR for the Sequence Foreman with different schemes, GOF size = 16

| Bit Rate(kb/s) | Y(PSNR) of [2] | Y(PSNR) of [4] | Y(PSNR) Invention |
|---|---|---|---|
| 96 | 18.01 | 19.53 | 20.43 |
| 80 | 16.03 | 19.04 | 19.84 |
| 70 | — | 18.62 | 19.46 |
| 64 | — | 18.40 | 19.18 |

TABLE 5

Comparison of the average PSNR for the sequence Mobile with different schemes, GOF size = 16

| Bit Rate(kb/s) | Y(PSNR) of [2] | Y(PSNR) of [4] | Y(PSNR) Invention |
|---|---|---|---|
| 96 | 18.01 | 19.53 | 20.43 |
| 80 | 16.03 | 19.04 | 19.84 |
| 70 | — | 18.62 | 19.46 |
| 64 | — | 18.40 | 19.18 |

INCORPORATED REFERENCES

The following are herein incorporated by reference:

[1] J. Ohm, "Three-Dimensional Sub-band Coding with Motion Compensation," IEEE Trans. on Image Processing, Vol. 3 No. 9, pp. 559571, September 1994.

[2] S. Choi and J. Woods, "Motion Compensated 3D Sub-band Coding of Video," IEEE Trans. on Image Processing, Vol. 8 No. 2, pp. 155167, February 1999.

[3] MCEZBC software package, ftp://ftp.cipr.rpi.edu/personal/chen/

[4] H. Hang, S. Tsai and T. Chiang, "Motion information scalability for MCEZBC: Response to Call for Evidence on Scalable Video Coding," ISO/IEC JTC1/Sc29/WG11, MPEG2003/m9756, July 2003, Tronheim.

[5] W. Han, "Response of Call for Proposal for Scalable Video Coding," ISO/IEC JTC1/SC 29 WG 11 MPEG2004/M10569/S7, Munchen, Germany, March 2004.

Which the above is a detailed description of the present invention, it is only exemplary and various modifications, alterations and equivalents may be employed in various apparati and processes described herein. Accordingly, the scope of the present invention is hereby defined by the metes and bounds of the following claims.

What is claimed is:

1. A non-transitory computer-readable medium having stored thereon a plurality of modules of computer-executable instructions of a scalable video coder, comprising:
   a grid-motion estimation and compensation module having a first input for receiving source video data, a second input for receiving desired bit rate and desired resolution parameters and an output, the grid motion estimation and compensation module operable to output a scalable motion vector computed from the source video data, and the desired bit rate and the desired resolution parameters supplied;
   a motion compensation temporal filtering module having a first input for receiving the source video data, a second input for receiving the scalable motion vector and an output, the motion compensation temporal filtering module operable to generate a residual image corresponding to the difference between images in the present and previous frames;
   a scalable coding module coupled to receive and encode the scalable motion vector;
   a discrete transformation module having inputs configured to receive the residual image and an output, the discrete transform module operable to domain transform the supplied video data to a sequence of coefficients; and
   a packetization module coupled to the scalable coding module and the discrete transformation module, the packetization module operable to combine the encoded scalable motion vector and the sequence of coefficients into a packet;
      wherein the grid-motion estimation and compensation module is operable to generate the scalable motion vector using two parameters $\lambda_{opt}$ and $\lambda_{high}$, wherein $\lambda_{opt}$ comprises a Lagrangian multiplier corresponding to a predefined optimal bit rate, and $\lambda_{high}$ comprises a Lagrangian multiplier corresponding to a bit rate higher than the predefined optimal bit rate; and
      wherein the grid-motion estimation and compensation module is operable to generate two groups of motion information and two residual images for each motion compensation pair in each resolution; and
      wherein the grid-motion estimation and compensation module is operable to perform grid motion estimation and compensation by means of a signal-to-noise ratio-refined motion estimation and compensation process to generate a signal-to-noise ratio refined residual image and corresponding motion vectors.

2. The non-transitory computer-readable medium of claim 1, wherein the scalable motion vector produced by the grid-motion estimation and compensation module comprises a predefined bit rate, said grid-motion estimation and compensation module further operable to truncate bit rate data to produce a scalable motion vector having a bit rate lower than the predefined bit rate.

3. The non-transitory computer-readable medium of claim 1, wherein the scalable motion vector produced by the grid-motion estimation and compensation module comprises a predefined bit rate, said grid-motion estimation and compensation module further operable to refine the bit rate data using a recursive process to produce a scalable motion vector having a bit rate higher than the predefined bit rate.

4. The non-transitory computer-readable medium of claim 1, wherein the scalable motion vector produced by the grid-motion estimation and compensation module comprises a predefined resolution level, said grid-motion estimation and compensation module further operable to truncate data to produce a scalable motion vector having a resolution level lower than the predefined resolution level.

5. The non-transitory computer-readable medium of claim 1, wherein the scalable motion vector produced by the grid-motion estimation and compensation module comprises a predefined resolution level, said grid-motion estimation and compensation module further operable to refine the resolution data using a recursive process to produce a scalable motion vector having a resolution level higher than the predefined resolution level.

6. The non-transitory computer-readable medium of claim 1, wherein the discrete transformation module comprises a discrete wavelet transformation module.

7. The non-transitory computer-readable medium of claim 1, wherein the discrete transformation module comprises a discrete cosine transformation module.

8. The non-transitory computer-readable medium of claim 1, wherein the grid-motion estimation and compensation module is operable at a predefined resolution level, and wherein the grid motion and estimation module generates the signal-to-noise ratio-refined residual image and corresponding motion vectors for a resolution level lower than predefined resolution level.

9. The non-transitory computer-readable medium of claim 1, wherein the grid-motion estimation and compensation module is operable at a predefined resolution level, and wherein the grid motion and estimation module generates the signal-to-noise ratio-refined residual image and corresponding motion vectors for a resolution level at a second resolution level different from the predefined resolution level.

10. The non-transitory computer-readable medium of claim 1, wherein the grid-motion estimation and compensation module is operable to variably select the accuracy of motion information.

11. The non-transitory computer-readable medium of claim 10, wherein the variable selection of the accuracy of motion information is related to the bit rate.

12. A scalable video coder, comprising:
   grid-motion estimation and compensation means having means for receiving source video data, desired bit rate and desired resolution parameters, the grid motion estimation and compensation means operable to output a scalable motion vector computed from the source video data, and the desired bit rate and the desired resolution parameters supplied;
   motion compensation temporal filtering means having means for receiving the source video data and the scalable motion vector, the motion compensation temporal filtering means operable to generate a residual image corresponding to the difference between images in the present and previous frames;
   scalable coding means coupled to receive and encode the scalable motion vector;
   discrete transformation means having inputs configured to receive the residual image and an output, the discrete transform means operable to domain transform the supplied video data to a sequence of coefficients; and
   packetization means coupled to the scalable coding means and the discrete transformation means, the packetization means operable to combine the encoded scalable motion vector and the sequence of coefficients into a packet;
      wherein the grid-motion estimation and compensation means is operable to generate the scalable motion vector using two parameters $\lambda_{opt}$ and $\lambda_{high}$, wherein $\lambda_{opt}$ comprises a Lagrangian multiplier corresponding to a predefined optimal bit rate, and $\lambda_{high}$ comprises a Lagrangian multiplier corresponding to a bit rate higher than the predefined optimal bit rate; and wherein the grid-motion estimation and compensation means is operable to generate two groups of motion information and two residual images for each motion compensation pair in each resolution; and wherein the grid-motion estimation and compensation means is operable to perform grid motion estimation and compensation by means of a signal-to-noise ratio-refined motion estimation and compensation process to generate a signal-to-noise ratio refined residual image and corresponding motion vectors.

13. The scalable video coder of claim 12, wherein the scalable motion vector produced by the grid-motion estimation and compensation means comprises a predefined bit rate, said grid-motion estimation and compensation means further operable to truncate bit rate data to produce a scalable motion vector having a bit rate lower than the predefined bit rate.

14. The scalable video coder of claim 12, wherein the scalable motion vector produced by the grid-motion estimation and compensation means comprises a predefined bit rate, said grid-motion estimation and compensation means further operable to refine the bit rate data using a recursive process to produce a scalable motion vector having a bit rate higher than the predefined bit rate.

15. The scalable video coder of claim 12, wherein the scalable motion vector field produced by the grid-motion estimation and compensation means comprises a predefined resolution level, said grid-motion estimation and compensation means further operable to truncate data to produce a scalable motion vector having a resolution level lower than the predefined resolution level.

16. The scalable video coder of claim 12, wherein the scalable motion vector produced by the grid-motion estimation and compensation means comprises a predefined resolution level, said grid-motion estimation and compensation means further operable to refine the resolution data using a recursive process to produce a scalable motion vector having a resolution level higher than the predefined resolution level.

17. The scalable video coder of claim 12, wherein the grid-motion estimation and compensation means is operable at a predefined resolution level, and wherein the grid motion and estimation means generates the signal-to-noise ratio-refined residual image and corresponding motion vector for a resolution level lower than predefined resolution level.

18. The scalable video coder of claim 12, wherein the grid-motion estimation and compensation means is operable at a predefined resolution level, and wherein the grid motion and estimation means generates the signal-to-noise ratio-refined residual image and corresponding motion vectors for a resolution level at a second resolution level different from the predefined resolution level.

19. The scalable video coder of claim 1 or 12, wherein the scalable video coder is operable to predict the residual images to be coded at a high bit rate from those already coded at a low bit rate.

20. The scalable video coder of claim 12, wherein the scalable video coder is operable to predict the residual images to be coded at a high bit rate from those already coded at a low bit rate.

* * * * *